US012607312B2

(12) United States Patent
Zou

(10) Patent No.: US 12,607,312 B2
(45) Date of Patent: Apr. 21, 2026

(54) STRING LAMP BODY AND STRING LAMP

(71) Applicant: Xinjiang Zou, Meizhou City (CN)

(72) Inventor: Xinjiang Zou, Meizhou City (CN)

( * ) Notice: Subject to any disclaimer, the term of this patent is extended or adjusted under 35 U.S.C. 154(b) by 0 days.

(21) Appl. No.: 18/788,345

(22) Filed: Jul. 30, 2024

(65) Prior Publication Data

US 2025/0389398 A1 Dec. 25, 2025

(30) Foreign Application Priority Data

Jun. 21, 2024 (CN) ......................... 202421443978.0

(51) Int. Cl.
*F21S 4/10* (2016.01)
*F21V 19/00* (2006.01)

(52) U.S. Cl.
CPC .............. *F21S 4/10* (2016.01); *F21V 19/007* (2013.01)

(58) Field of Classification Search
CPC ................................ F21S 4/10; F21V 19/007
See application file for complete search history.

(56) References Cited

U.S. PATENT DOCUMENTS

2025/0052410 A1* 2/2025 Yang ....................... F21V 23/06

* cited by examiner

*Primary Examiner* — Anne M Hines

(57) ABSTRACT

Provided in the present application are a string lamp body and a string lamp. The string lamp body is connected to a power line. The string lamp body includes: a lamp holder, a lamp housing, a lamp bead and a tube body, where the lamp holder includes inclined plates, the lamp holder is mounted at the lamp housing, the tube body is clamped in the lamp holder by means of the inclined plate, and the lamp bead is mounted at the tube body. As the tube body can be clamped in the lamp holder by means of the inclined plates, such that the lamp bead can be mounted conveniently and stably, and a lamp line of the lamp bead can be accommodated and arranged conveniently.

8 Claims, 4 Drawing Sheets

STRING LAMP BODY AND STRING LAMP

CROSS-REFERENCE TO RELATED APPLICATIONS

The application claims priority of Chinese patent application CN 2024214439780, filed on Jun. 21, 2024, which is incorporated herein by reference in its entireties.

TECHNICAL FIELD

The present application relates to the technical field of lamps, and in particular, to a string lamp body and a string lamp.

BACKGROUND

An LED Christmas lamp string is an essential ornament for Christmas season decoration, and can be mounted Christmas trees, living rooms, bedrooms, main corridors of stairs, courtyards and outdoors. Let's share what Christmas lamp strings are.

An LED lamp string is mainly used for holiday decoration and Christmas decoration, has the characteristic of waterproofness and can be directly put into water. A lamp line is flexible and soft and can be bent at will. A product has the main characteristics, waterproofness, environmental protection, low temperature, small electric quantity, low voltage, long life and wide application range. The lamp string can be woven into a variety of modeling lamp strings and various difficult handicrafts.

In an existing LED lamp string, due to the connection of a lamp bead and a lamp line, if the lamp line is too messy, the lamp line is easily caught and dragged by other objects during mounting or movement, so that the mounting stability of the lamp bead is affected. Meanwhile, a messy and bad impression will be given to users, and it is inconvenient for the users to organize and store.

SUMMARY

Based on this, it is necessary to provide a string lamp body to solve at least one of the above problems.

According to a first aspect, the present application provides a string lamp body, connected to a power line. The string lamp body includes: a lamp holder, a lamp housing, a lamp bead and a tube body, where the lamp holder comprises inclined plates, the lamp holder is mounted at the lamp housing, the tube body is clamped in the lamp holder by means of the inclined plates, and the lamp head is mounted at the tube body.

Further, a plurality of inclined plates are provided, and an opening is formed between the adjacent inclined plates.

Further, the inclined plates are deformed elastically and selectively; and when the tube body is clamped lamp holder by means of the inclined plates, the inclined plates are elastically deformed, and the adjacent inclined plates are close to each other to make the opening smaller.

Further, the lamp holder has a protrusion, the lamp housing has a first groove at a position corresponding to the protrusion, and the protrusion is clamped in the first groove to make the lamp holder be mounted at the lamp housing.

Further, the lamp holder has a second groove, and the inclined plates are at least partially arranged in the second groove to form an activity space for the elastic deformation of the inclined plates between a surface of the second groove corresponding to the inclined plates and the inclined plates.

Further, the lamp housing has a step at a position corresponding to the second groove, a side of the step corresponding to the second groove is provided with the first groove, a surface of the second groove corresponding to the first groove is provided with the protrusion, and the protrusion is clamped in the first groove to make the lamp holder be mounted at the lamp housing.

Further, the string lamp body further includes a lamp line, where the lamp line is at least partially located in the tube body, and the lamp line is electrically connected to the lamp bead and the power line respectively for the power connection of the lamp bead.

Further, the lamp bead includes a lead, the lead is located in the tube body, and the lamp line is electrically connected to the lead of the lamp bead and the power line respectively for the power connection of the lamp bead.

Further, the lamp bead is at least partially clamped in the tube body, and/or the lamp bead is at least partially clamped in the lamp housing.

The string lamp body is provided with the tube body that can be clamped in the lamp holder by means of the inclined plates, so the lamp bead can be mounted conveniently and stably, and a lamp line of the lamp bead can be accommodated and arranged conveniently.

According to a second aspect, the present application further provides a string lamp, including the string lamp body according to any one of the above embodiments, and a power line, where a plurality of string lamp bodies are provided, the plurality of string lamp bodies are sequentially arranged to be fixedly connected to the power line, and the string lamp bodies are electrically connected to the power line.

The string lamp is provided with the string lamp body having the tube body that can be clamped in the lamp holder by means of the inclined plates, so the lamp bead can be mounted conveniently and stably, and a lamp line of the lamp bead can be accommodated and arranged conveniently.

BRIEF DESCRIPTION OF DRAWINGS

The drawings are only used for illustrative description, and cannot be understood as a limitation to this patent; and the same reference numerals are used for components with the same structure and the same function. In the drawings.

Figure 1:
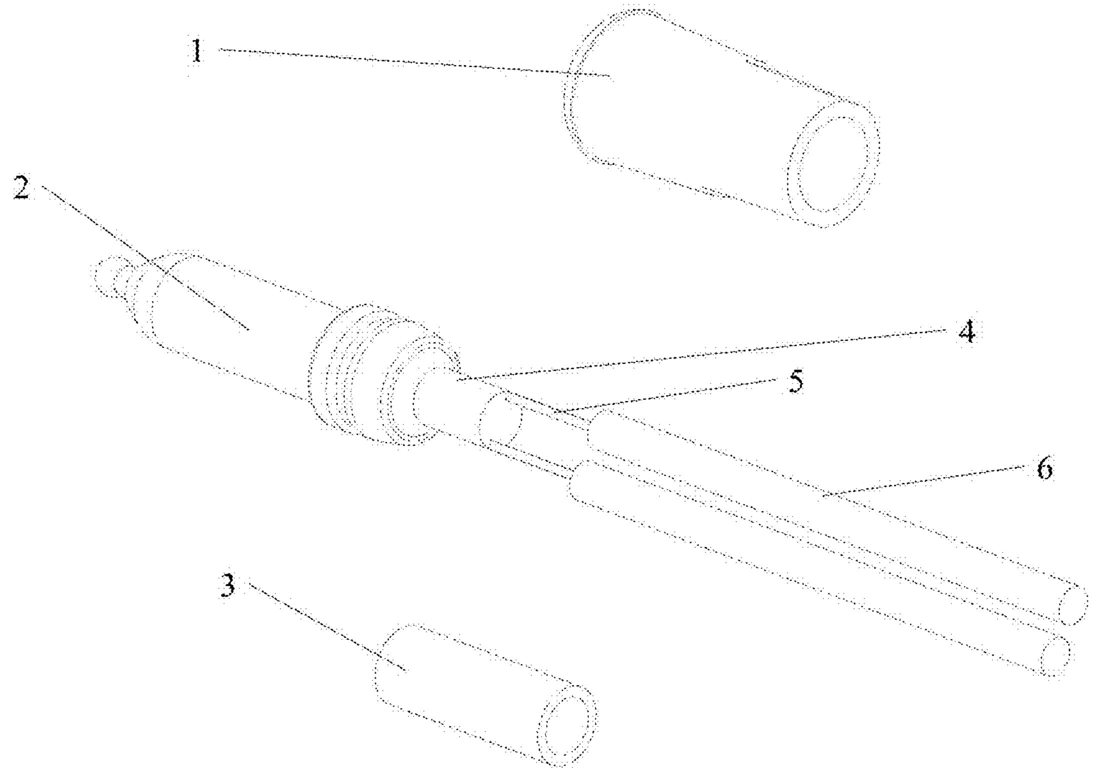
FIG. 1 is a schematic diagram of a breakdown structure of a string lamp body according to an embodiment of the present application.

The description of reference numerals of the drawings: lamp holder—1; inclined plate—101; protrusion—102; second groove—103; opening—104; lamp housing—2; step—201; groove—231; first groove—202; tube body—3; lamp bead—4; lead—5; lamp line—6.

DETAILED DESCRIPTION OF THE EMBODIMENTS

The technical solutions in the embodiments of the present application are described below with reference to the accompanying drawings in the embodiments of the present application. In the description of the embodiments of the present application, "/" represents "or" unless otherwise specified. For example, A/B may indicate A or B; and "and/or" is merely an association relationship that describes associated objects, and indicates that there may be three relationships. For example, A and/or B may represent three cases: only A exists, both A and B exist, and only B exists. In addition, in the description of the embodiments of the present application, "a plurality of" means two or more.

Hereinafter, the terms "first", "second" and the like are used only for description and shall not be interpreted as an indication or implication of relative importance or an implicit indication of the number of technical features. Thus, the feature defined by "first" and "second" can explicitly or implicitly include one or more features.

Figure 2A:
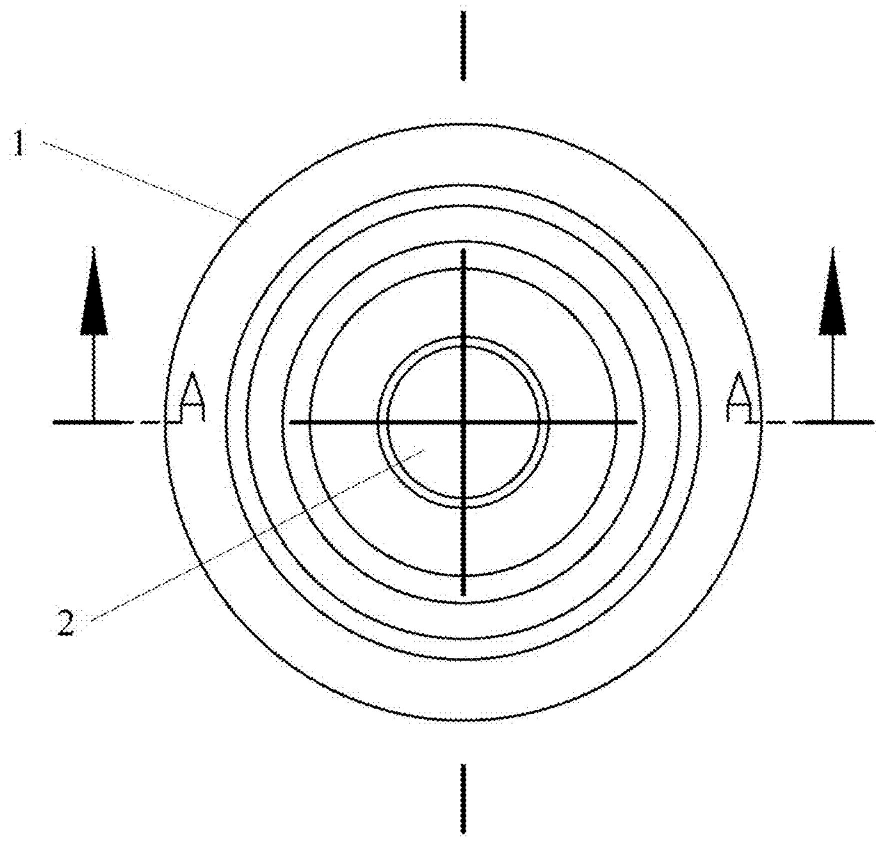
FIG. 2*a* is a schematic diagram of a front-view structure of a string lamp body according to an embodiment of the present application.
Figure 2B:
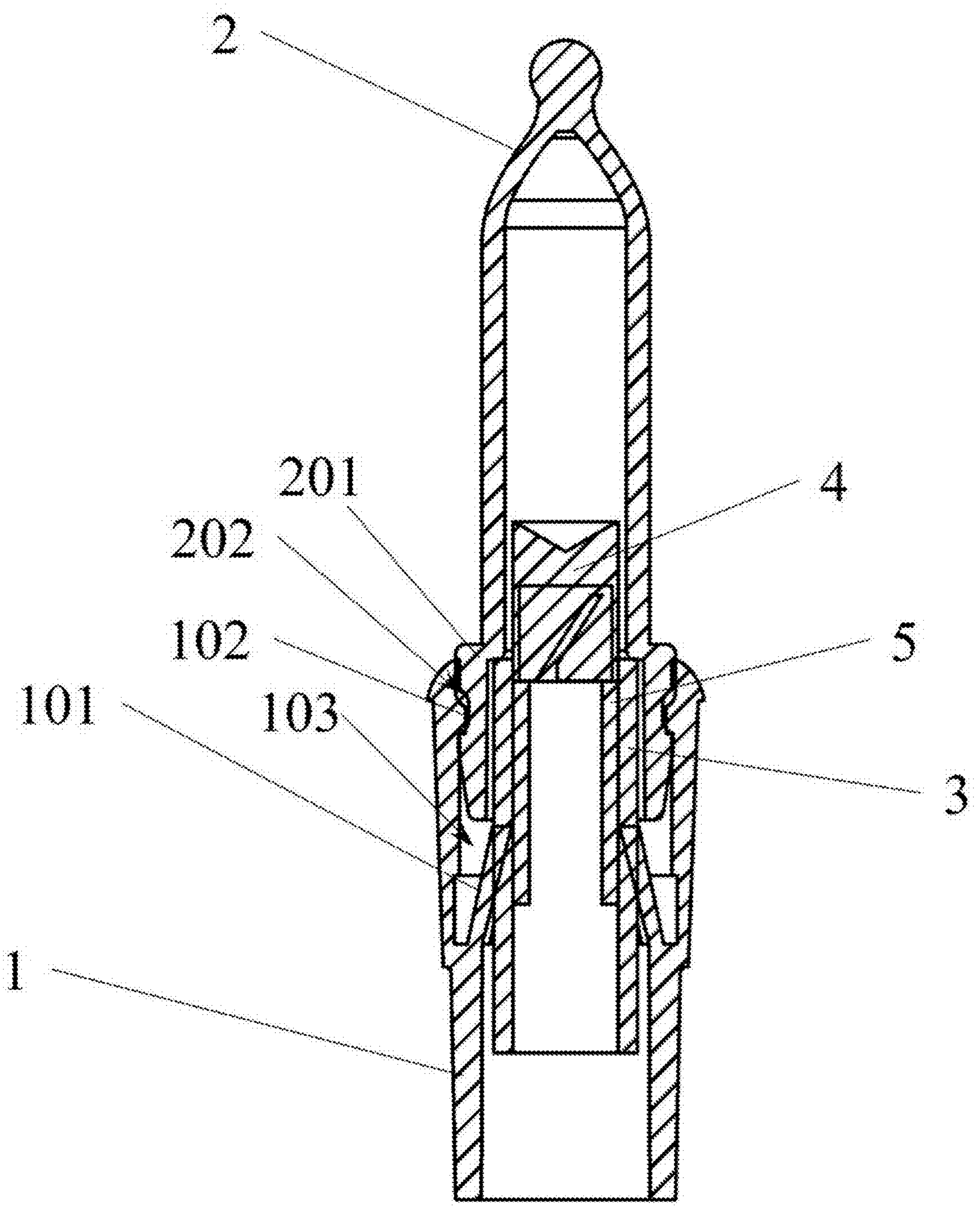
FIG. 2*b* is a schematic diagram of a sectional structure along a direction A-A in FIG. 2*a*.
Figure 3:
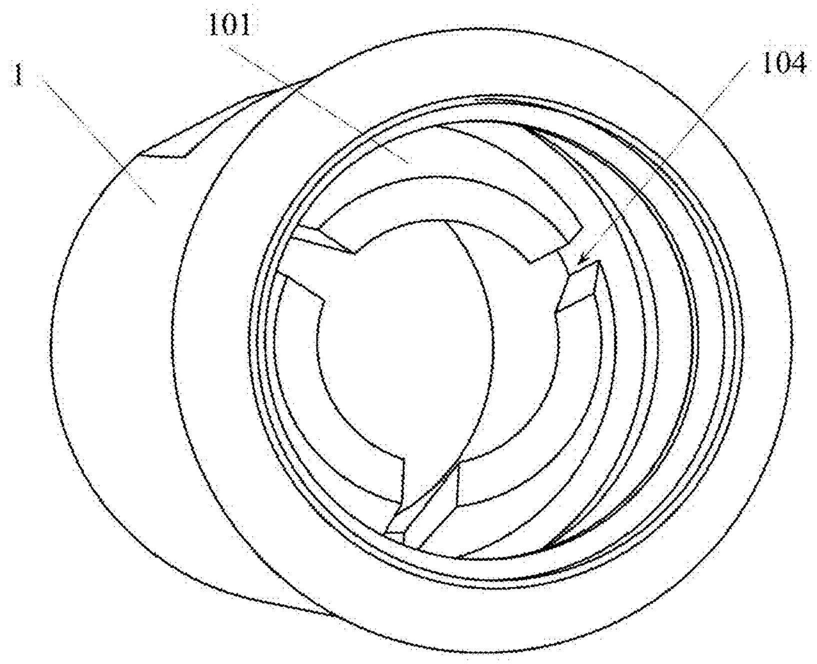
FIG. 3 is a schematic diagram according to an embodiment of the present application.

Referring to FIG. 1 to FIG. 3, according to a first aspect, in this embodiment, exemplarily, the present application provides a string lamp body, connected to a power line. The string lamp body includes: a lamp holder 1, a lamp housing 2, a lamp bead 4 and a tube body 3, where the lamp holder 1 includes inclined plates 101, the lamp holder 1 is mounted at the lamp housing 2, the tube body 3 is clamped in the lamp holder 1 by means of the inclined plates 101, and the lamp bead 4 is mounted at the tube body 3.

Therefore, the tube body 3 that can be clamped in the lamp holder 1 by means of the inclined plates 101, so the lamp bead 4 can be mounted conveniently and stably, and a lamp line 6 of the lamp bead 4 can be accommodated and arranged conveniently.

The lamp holder 1 is a frustum. It may be understood that in some embodiments, the lamp holder 1 may further be of other shapes.

The lamp housing 2 may be of a strip shape. It may be understood that in some embodiments, the lamp housing 2 may further be of other shapes.

The number of the inclined plates 101 is 3. An opening 104 is formed between the adjacent inclined plates 101. It may be understood that in some embodiments, the number of the inclined plates 101 is 2, 4 and 5, which is not limited to this.

The inclined plates 101 are deformed elastically and selectively; and when the tube body 3 is clamped in the lamp holder 1 by means of the inclined plates 101, the inclined plates 101 are elastically deformed, and the adjacent inclined plates 101 are close to each other to make the opening 104 smaller.

It may be understood that in some embodiments, the inclined plates 101 may also be replaced with a strip shape, a columnar shape or other shapes.

The inclined plates 101 are elastically deformed through bending deformation. It may be understood that in some embodiments, the inclined plates 101 may also be elastically deformed through compressed deformation, longitudinal deformation and torsional deformation, but it is not limited to this, as long as a force can be applied to the tube body 3 through deformation to fix the tube body 3.

The lamp holder 1 has a protrusion 102, the lamp housing 2 has a first groove 202 at a position corresponding to the protrusion 102, and the protrusion 102 is clamped in the first groove 202, so that the lamp holder 1 is mounted at the lamp housing 2, thereby improving the mounting waterproofness and airtightness.

It may be understood that in some embodiments, the lamp holder 1 has a groove, and the lamp housing 2 has a protrusion at a position corresponding to the groove.

The lamp holder 1 has a second groove 103, and the inclined plates 101 are at least partially arranged in the second groove 103 to form an activity space for the elastic deformation of the inclined plates 101 between a surface of the second groove 103 corresponding to the inclined plates 101 and the inclined plates 101.

The lamp housing 2 has a step 201 at a position corresponding to the second groove 103, a side of the step 201 corresponding to the second groove 103 is provided with a first groove 202, a surface of the second groove 103 corresponding to the first groove 202 is provided with a protrusion 102, and the protrusion 102 is clamped in the first groove 202, so that the lamp holder 1 is mounted at the lamp housing 2. In this way, the mounting structure of the protrusion and the groove can be suitable for the lamp housing 2 with a smaller size.

The string lamp body further includes a lamp line 6, where the lamp line 6 is at least partially located in the tube body 3, and the lamp line 6 is electrically connected to the lamp bead 4 and the power line respectively for the power connection of the lamp bead 4.

The lamp bead 4 includes a lead 5, the lead 5 is located in the tube body 3, and the lamp line 6 is electrically connected to the lead 5 of the lamp bead 4 and the power line respectively for the power connection of the lamp bead 4.

The lamp bead 4 is at least partially clamped in the tube body 3.

It may be understood that in some embodiments, the lamp bead 4 is at least partially clamped in the lamp housing 2.

According to a second aspect, in this embodiment, exemplarily, the present application provides a string lamp, including the string lamp body according to any one of the above embodiments, and a power line, where a plurality of string lamp bodies are provided, the plurality of string lamp bodies are sequentially arranged to be fixedly connected to the power line, and the string lamp bodies are electrically connected to the power line.

In the description of this embodiment, unless otherwise specified, "a plurality of" means two or more. The foregoing descriptions are merely specific embodiments of the present application, but are not intended to limit the protection scope of the present application. Any variation or replacement within the technical scope disclosed in the present application shall fall within the protection scope of the present application. Therefore, the protection scope of the present application should be subject to the protection scope of the claims.

What is claimed is:

1. A string lamp body, connected to a power line, and comprising: a lamp holder, a lamp housing, a lamp bead and a tube body, wherein the lamp holder comprises inclined plates, the lamp holder is mounted at the lamp housing, the tube body is clamped in the lamp holder by the inclined plates, and the lamp bead is mounted at the tube body;

wherein an opening is formed between adjacent inclined plates; the inclined plates are deformed elastically and selectively; and when the tube body is clamped in the lamp holder by the inclined plates, the inclined plates are elastically deformed, and the adjacent inclined plates are close to each other to make the opening smaller.

2. The string lamp body according to claim 1, wherein the lamp holder has a protrusion, the lamp housing has a first groove at a position corresponding to the protrusion, and the protrusion is clamped in the first groove to make the lamp holder be mounted at the lamp housing.

3. The string lamp body according to claim 2, wherein the lamp holder has a second groove, and the inclined plates are at least partially arranged in the second groove to form an activity space for an elastic deformation of the inclined plates between a surface of the second groove corresponding to the inclined plates and the inclined plates.

4. The string lamp body according to claim 3, wherein the lamp housing has a step at a position corresponding to the second groove, a side of the step corresponding to the second groove is provided with the first groove, a surface of the second groove corresponding to the first groove is provided with the protrusion, and the protrusion is clamped in the first groove to make the lamp holder be mounted at the lamp housing.

5. The string lamp body according to claim 1, further comprising a lamp line, wherein the lamp line is at least partially located in the tube body, and the lamp line is electrically connected to the lamp bead and the power line respectively for the power connection of the lamp bead.

6. The string lamp body according to claim 5, wherein the lamp bead comprises a lead, the lead is located in the tube body, and the lamp line is electrically connected to the lead of the lamp bead and the power line respectively for the power connection of the lamp bead.

7. The string lamp body according to claim 6, wherein the lamp bead is at least partially clamped in the tube body, and/or the lamp bead is at least partially clamped in the lamp housing.

8. A string lamp, comprising the string lamp body according to claim 1, and a power line, wherein a plurality of string lamp bodies are provided, the plurality of string lamp bodies are sequentially arranged to be fixedly connected to the power line, and the string lamp bodies are electrically connected to the power line.

* * * * *